US010631368B2

(12) United States Patent
Hsu et al.

(10) Patent No.: US 10,631,368 B2
(45) Date of Patent: Apr. 21, 2020

(54) MICRO-ELECTROMECHANICAL TEMPERATURE CONTROL SYSTEM WITH THERMAL RESERVOIR

(71) Applicant: Industrial Technology Research Institute, Hsinchu (TW)

(72) Inventors: Yu-Wen Hsu, Tainan (TW); Chung-Yuan Su, Taichung (TW); Chao-Ta Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 742 days.

(21) Appl. No.: 15/250,869

(22) Filed: Aug. 29, 2016

(65) Prior Publication Data

US 2017/0188413 A1    Jun. 29, 2017

Related U.S. Application Data

(60) Provisional application No. 62/271,326, filed on Dec. 28, 2015.

(30) Foreign Application Priority Data

Dec. 28, 2015  (TW) .............................. 104143996 A

(51) Int. Cl.
*H05B 1/02* (2006.01)
*H05B 3/26* (2006.01)
(Continued)

(52) U.S. Cl.
CPC ............. *H05B 1/023* (2013.01); *G01N 27/12* (2013.01); *G05D 23/24* (2013.01); *H05B 3/265* (2013.01); *H05B 2203/003* (2013.01)

(58) Field of Classification Search
CPC .. H05B 1/023; H05B 3/215; H05B 2203/003; H05B 1/0288; H05B 1/267; G01N 27/12; G05B 23/24
(Continued)

(56) References Cited

U.S. PATENT DOCUMENTS 5,464,966 A * 11/1995 Gaitan ...................... B01L 7/00
219/543
5,948,361 A * 9/1999 D'Aragona ............ G01N 27/12
422/98

(Continued)

FOREIGN PATENT DOCUMENTS

| CN | 1732383 | 2/2006 |
|----|---------|--------|
| CN | 101349669 | 1/2009 |

(Continued)

OTHER PUBLICATIONS

"Office Action of China Counterpart Application," dated Jun. 19, 2018, pp. 1-5.
(Continued)

Primary Examiner — Mark H Paschall
(74) Attorney, Agent, or Firm — JCIPRNET

(57) ABSTRACT

A micro-electromechanical temperature control system including a micro-electromechanical apparatus is provided. The micro-electromechanical apparatus includes a heater and a thermal reservoir. A specific heat capacity of the thermal reservoir is greater than a specific heat capacity of the heater, so that a heating time and a heating frequency of the heater are reduced to save electrical power consumption. The micro-electromechanical temperature control system is adapted for a micro-electromechanical sensor that is required to be controlled at an operating temperature, such as a gas sensor.

18 Claims, 13 Drawing Sheets

(51) Int. Cl.
*G05D 23/24* (2006.01)
*G01N 27/12* (2006.01)

(58) Field of Classification Search
USPC .......... 219/493, 494, 497, 544, 540, 543
See application file for complete search history.

(56) References Cited

U.S. PATENT DOCUMENTS

| | | | |
|---|---|---|---|
| 6,042,264 | A | 3/2000 | Prusik et al. |
| 6,161,421 | A | 12/2000 | Fang et al. |
| 6,326,229 | B1 * | 12/2001 | Mastromatteo ........ G01N 27/12 257/225 |
| 7,797,997 | B2 | 9/2010 | Wu et al. |
| 7,827,847 | B2 | 11/2010 | Oishi et al. |
| 7,911,010 | B2 | 3/2011 | Stetter |
| 8,618,611 | B2 | 12/2013 | Xie et al. |
| 8,683,847 | B2 | 4/2014 | Moon et al. |
| 2003/0121906 | A1 * | 7/2003 | Abbott .................. B29C 45/73 219/543 |
| 2004/0211667 | A1 * | 10/2004 | Sberveglieri .......... G01N 27/12 204/426 |
| 2005/0130360 | A1 | 6/2005 | Zhan et al. |
| 2009/0173141 | A1 | 7/2009 | Grosse Bley et al. |
| 2012/0161253 | A1 | 6/2012 | Hsieh et al. |
| 2012/0297860 | A1 | 11/2012 | Izawa et al. |
| 2014/0060554 | A1 * | 3/2014 | Collett .................. H05B 3/265 131/328 |
| 2014/0318960 | A1 | 10/2014 | Huang et al. |

FOREIGN PATENT DOCUMENTS

| | | |
|---|---|---|
| CN | 101762623 | 6/2010 |
| CN | 101807662 | 8/2010 |
| CN | 101809436 | 8/2010 |
| CN | 103517542 | 1/2014 |
| CN | 204129000 | 1/2015 |
| CN | 104458828 | 3/2015 |
| EP | 0566116 | 10/1993 |
| TW | 304307 | 5/1997 |
| TW | I239400 | 9/2005 |
| TW | 201226895 | 7/2012 |
| TW | 201241408 | 10/2012 |
| TW | 201327722 | 7/2013 |
| TW | I434037 | 4/2014 |
| TW | 201425205 | 7/2014 |
| TW | I452287 | 9/2014 |
| TW | I513981 | 12/2015 |

OTHER PUBLICATIONS

Fujiyoshi et al., "SOI 3-axis Accelerometer with a Stress Reduction Structure," 2014 IEEE Sensors, Nov. 2014, pp. 1-4.
Li et al., "Stress-induced warpage and the compensation in a composite micro-accelerometer," Proc. SPIE 2882, Micromachined Devices and Components II, Sep. 1996, pp. 147-151.
Hsieh et al., "A novel stress isolation guard-ring design for the improvement of a three-axis piezoresistive accelerometer," Journal of Micromechanics and Microengineering, Sep. 2011, pp. 1-11.
Yang et al., "A New Z-axis Resonant Micro-Accelerometer Based on Electrostatic Stiffness," Sensors, Jan. 2015, pp. 687-702.
Zhang et al., "A SOI Sandwich Differential Capacitance Accelerometer with Low-stress Package," Proceedings of the 9th IEEE International Conference on Nano/Micro Engineered and Molecular Systems, Apr. 2014, pp. 341-345.
Zhou et al., "Fabrication of a MEMS capacitive accelerometer with symmetrical double-sided serpentine beam-mass structure," Microsyst Technol, Sep. 2013, pp. 1365-1372.
Graf et al., "CMOS microhotplate sensor system for operating temperatures up to 500° C.," Sensors and Actuators, Jan. 2006, pp. 346-352.
Wisitsoraat et al., "Design and Simulation of Electro-fabricated MEMS Microhotplatefor Gas Sensor Applications," Journal of Physics: Conference Series, Apr. 2006, pp. 643-649.
Vereshchagina et al., "Low power micro-calorimetric sensors for analysis of gaseous samples," Sensors and Actuators B: Chemical, Sep. 2014, pp. 772-787.
Walden et al., "Micromachined Hotplate Platform for the Investigation of Ink-Jet Printed, Functionalized Metal Oxide Nanoparticles," Journal of Microelectromechanical Systems, Oct. 2015, pp. 1-7.
Suehle et al., "Tin Oxide Gas Sensor Fabricated Using CMOS Micro-Hotplates and In-Situ Processing," IEEE Electron Device Letters, Mar. 1993, pp. 118-120.
"Office Action of Taiwan Counterpart Application", dated Jun. 28, 2016, p. 1-p. 4.

* cited by examiner

MICRO-ELECTROMECHANICAL TEMPERATURE CONTROL SYSTEM WITH THERMAL RESERVOIR

CROSS-REFERENCE TO RELATED APPLICATION

This application claims the priority benefits of U.S. provisional application Ser. No. 62/271,326, filed on Dec. 28, 2015, and Taiwan application serial no. 104143996, filed on Dec. 28, 2015. The entirety of each of the above-mentioned patent applications is hereby incorporated by reference herein and made a part of this specification.

TECHNICAL FIELD

The disclosure relates to a micro-electromechanical temperature control system, and relates to a micro-electromechanical temperature control system having a thermal reservoir.

BACKGROUND

With the development of Internet of Things (IoT) and Smart Home, environment sensing techniques frequently applied at home are in continuous progress; among these techniques, the gas sensing technique is strongly demanded. The gas sensing technique may be applied not only for monitoring a residential environment but also for monitoring an environment at offices, factories, hospitals, or any other public areas. A gas sensor may be employed to detect whether pernicious gas exists in the surroundings, and an alert may be issued if the pernicious gas in the surroundings is detected, so as to prevent human beings from inhaling the pernicious gas. Most of the existing gas sensors are required to be operated at a high and constant temperature. Since the heat energy of the gas sensing layer is easily dissipated, the gas sensing layer is required to be constantly heated by a heater, such that the gas sensing layer may remain at a high temperature. As such, electricity may be continuously supplied to the heater, thus leading to significant electrical energy consumption. Besides, when the gas sensing layer disposed on a support film is being heated by the heater, it is easily for the support film to be cracked or warped, which lessens the accuracy and reliability of the gas sensor.

For instance, the gas sensor is integrated with a temperature sensor, a moisture sensor, an air quality sensor, or any other sensor to create a multi-functional environment sensor, so as to monitor the gas, the temperature, the moisture, or the air quality of the environment and thereby improve the safety and comfort of the surroundings. In view of the above, the environment sensing techniques may be developed in order to satisfy the requirements for multi-functional monitoring. Hence, how to develop the gas sensor characterized by high sensing accuracy, high reliability, and low electrical power consumption or develop the multi-functional environment sensor has become one of the issues to be resolved in the pertinent field.

FIG. 1 is a schematic view illustrating a conventional gas sensing apparatus. With reference to FIG. 1, a gas sensing apparatus 10 heats a gas sensing film 12 through a heater 11, so as to increase the variation level of the electrical resistance generated by the gas sensing film 12 in response to the variations in the concentration of target gas. Through measuring the amount of electrical current input to the gas sensing film 12 by an electrode 13, the variation level of the electrical resistance of the gas sensing film 12 may be calculated, and the variations in the concentration of target gas around the gas sensing apparatus 10 may be learned.

FIG. 2 is a schematic view illustrating a conventional micro-electromechanical semiconductor gas sensor. With reference to FIG. 2, a first film 21 and a second film 22 connected to the first film 21 of the micro-electromechanical semiconductor gas sensor 20 are penetrated by plural vias that are not covered by a heater 23 nor by a sensing electrode 24. Hence, heat may be dissipated to the surroundings through the vias, so as to prevent the first film 21 and the second film 22 from being warped and distorted by thermal stress.

FIG. 3 is a schematic view illustrating a conventional micro-electromechanical oxygen sensor, wherein a temperature sensor 32, a heater 33, and a sensing material layer 34 are disposed on a film 31. The heater 33 timely heats the sensing material layer 34 according to the temperature detected by the temperature sensor 32 to control the temperature of the sensing material layer 34.

FIG. 4 is a schematic view illustrating a conventional micro-electromechanical gas sensor. With reference to FIG. 4, a porous layer 42 is embedded in a mono-crystalline substrate 41 of a micro-electromechanical gas sensor 40, and a lower insulation layer 43 covers the mono-crystalline substrate 41 and the porous layer 42. In addition, a heating layer 44 is disposed on the lower insulation layer 43 and right above the porous layer 42. Hence, the porous layer 42 may stably support the heating layer 44 and prevent the lower insulation layer 43 from being warped and distorted by thermal stress while the micro-electromechanical gas sensor 40 is being operated at a high temperature. Since the heating layer 44 is disposed right above the porous layer 42, favorable thermally insulating effects may be accomplished.

In light of the foregoing, common micro-electromechanical environment sensors may keep the environment sensing layer to remain at a constant temperature if a heating device is employed to continuously heat the environment sensing layer.

SUMMARY

In an exemplary embodiment of the disclosure, a micro-electromechanical temperature control system including a micro-electromechanical apparatus is provided. The micro-electromechanical apparatus includes a base, a film, a heater, and a thermal reservoir. The base has a space. The film is disposed on the base and has a first surface and a second surface opposite to the first surface. The film covers the space. The heater is disposed on the first surface of the film. The thermal reservoir is disposed on the second surface of the film and enclosed in the space. A specific heat capacity of the thermal reservoir is greater than a specific heat capacity of the heater.

In an exemplary embodiment of the disclosure, another micro-electromechanical temperature control system including a micro-electromechanical apparatus is provided. The micro-electromechanical apparatus includes a base, a film, a heater, a thermal reservoir, and a heat spreader. The base has a space. The film is disposed on the base and has a first surface and a second surface opposite to the first surface. The film covers the space. The heater is disposed on the first surface of the film. The thermal reservoir is disposed on the second surface of the film and enclosed in the space. The heat spreader includes at least one thermally conductive layer and at least one thermally conductive element. A specific heat capacity of the thermal reservoir is greater than a specific heat capacity of the heater. The at least one thermally conductive layer is disposed on the first surface of the film. The at least one thermally conductive element penetrates the film, and the thermal reservoir connects through the at least one thermally conductive element with the at least one thermally conductive layer.

In an exemplary embodiment of the disclosure, another micro-electromechanical temperature control system including a micro-electromechanical apparatus and an integrated circuit (IC) chip is provided. The micro-electromechanical apparatus includes a base, a film, a heater, a thermal reservoir, and a temperature sensor. The base has a space. The film is disposed on the base and has a first surface and a second surface opposite to the first surface. The film covers the space. The heater is disposed on the first surface of the film. The thermal reservoir is disposed on the second surface of the film and enclosed in the space. The temperature sensor is disposed on the first surface of the film. The IC chip includes a temperature control device. The temperature control device is electrically coupled to the temperature sensor and the heater, respectively. A specific heat capacity of the thermal reservoir is greater than a specific heat capacity of the heater. The temperature control device adjusts an amount of heat generated by the heater according to a temperature detected by the temperature sensor.

In an exemplary embodiment of the disclosure, a micro-electromechanical temperature control system adapted for sensing gas is provided. The micro-electromechanical temperature control system includes a substrate, a micro-electromechanical apparatus, and an IC chip. The micro-electromechanical apparatus includes a base, a film, a heater, a thermal reservoir, an electrically conductive device, a substrate, a heat spreader, a temperature sensor, and a gas sensing layer. The base has a space and is disposed on the substrate. The film is disposed on the base and has a first surface and a second surface opposite to the first surface. The film covers the space. A thermally insulating chamber is defined by the base, the substrate, and the film. The heater is disposed on the first surface of the film. The thermal reservoir is disposed on the second surface of the film and enclosed in the thermally insulating chamber. The electrically conductive device penetrates the film and electrically connects the heater and the thermal reservoir. The heat spreader includes at least one thermally conductive layer and at least one thermally conductive element. The at least one thermally conductive layer is disposed on the first surface of the film. The at least one thermally conductive element penetrates the film, and the thermal reservoir connects through the at least one thermally conductive element with the at least one thermally conductive layer. The temperature sensor is disposed on the first surface of the film. The gas sensing layer is disposed on the heater and the temperature sensor. The IC chip includes a temperature control device. The temperature control device is electrically coupled to the temperature sensor and the heater, respectively. A specific heat capacity of the thermal reservoir is greater than a specific heat capacity of the heater. The temperature control device adjusts an amount of heat generated by the heater according to a temperature detected by the temperature sensor.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
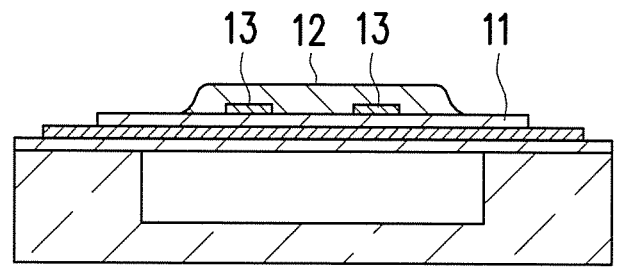
FIG. 1 is a schematic view illustrating a conventional gas sensing apparatus.
Figure 2:
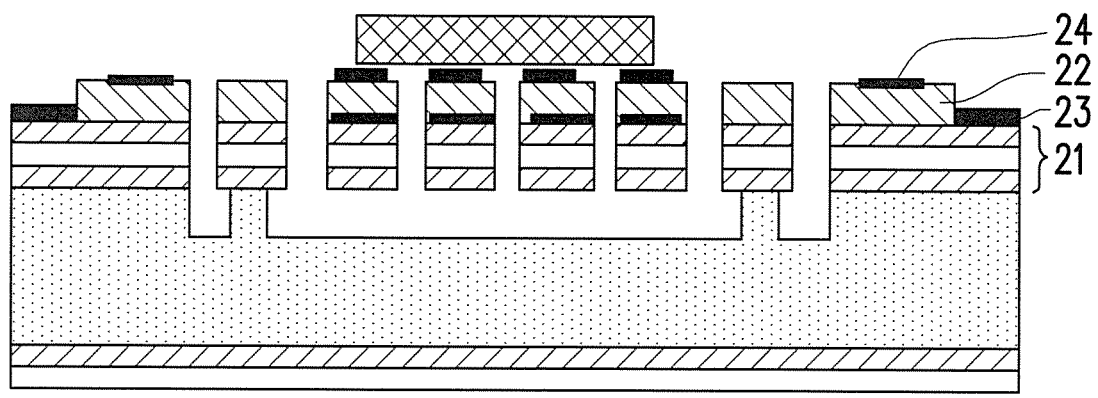
FIG. 2 is a schematic view illustrating a conventional micro-electromechanical semiconductor gas sensor.
Figure 3:
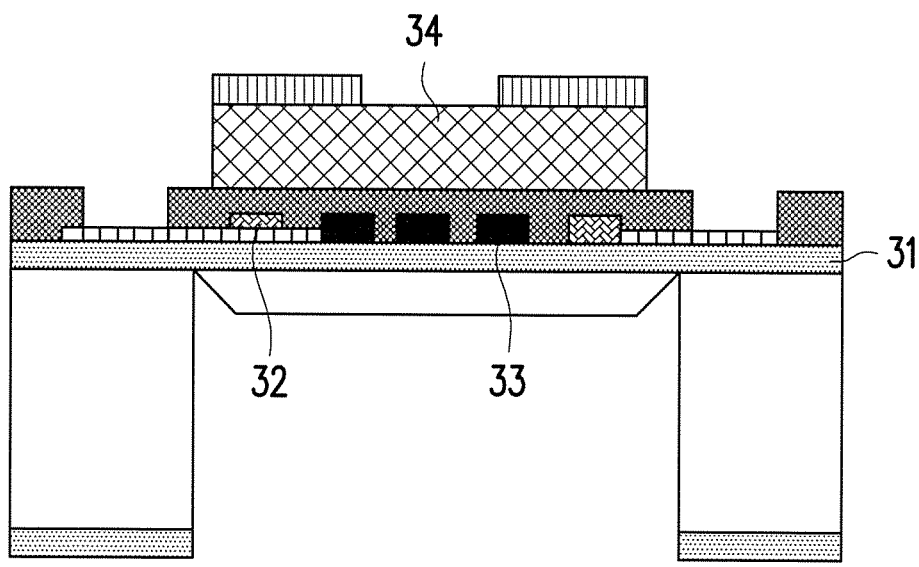
FIG. 3 is a schematic view illustrating a conventional micro-electromechanical oxygen sensor.
Figure 4:
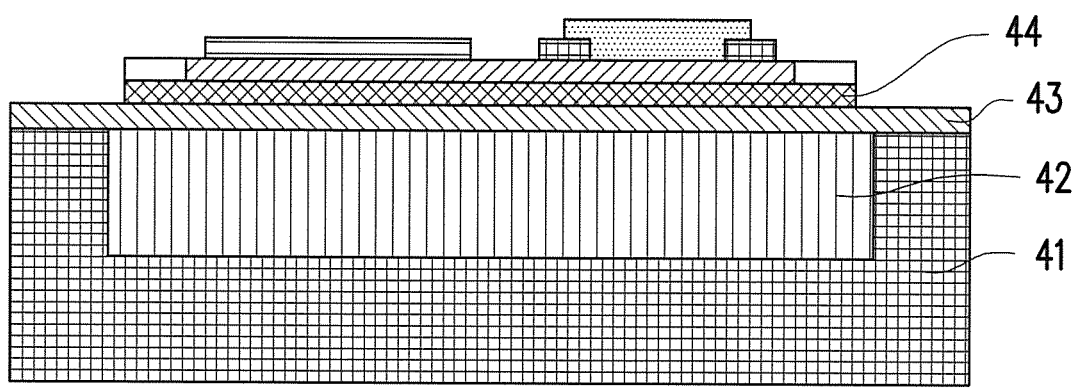
FIG. 4 is a schematic view illustrating a conventional micro-electromechanical gas sensor.
Figure 5:
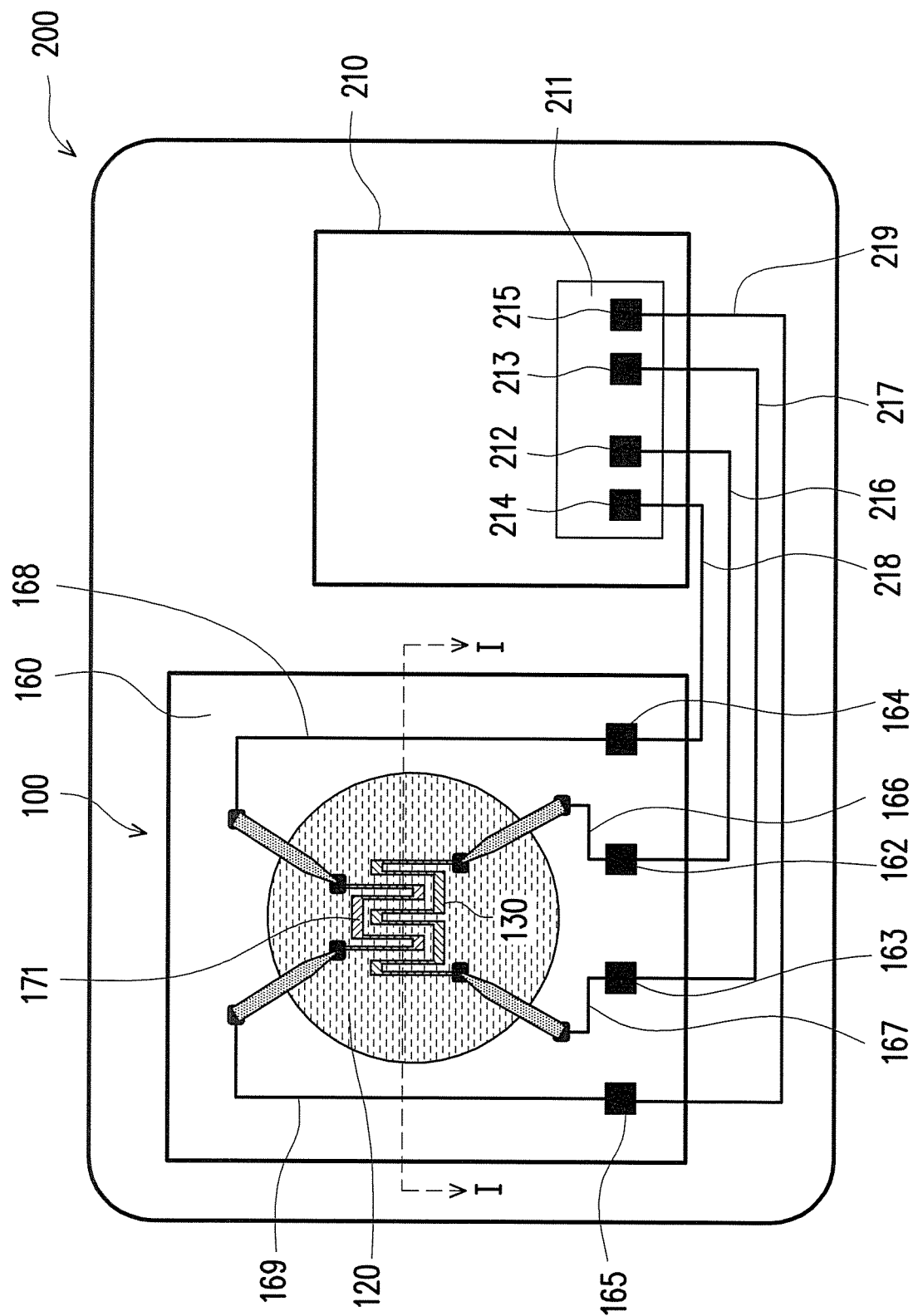
FIG. 5 is a schematic top view illustrating a micro-electromechanical temperature control system according to a first exemplary embodiment of the disclosure.
Figure 6A:
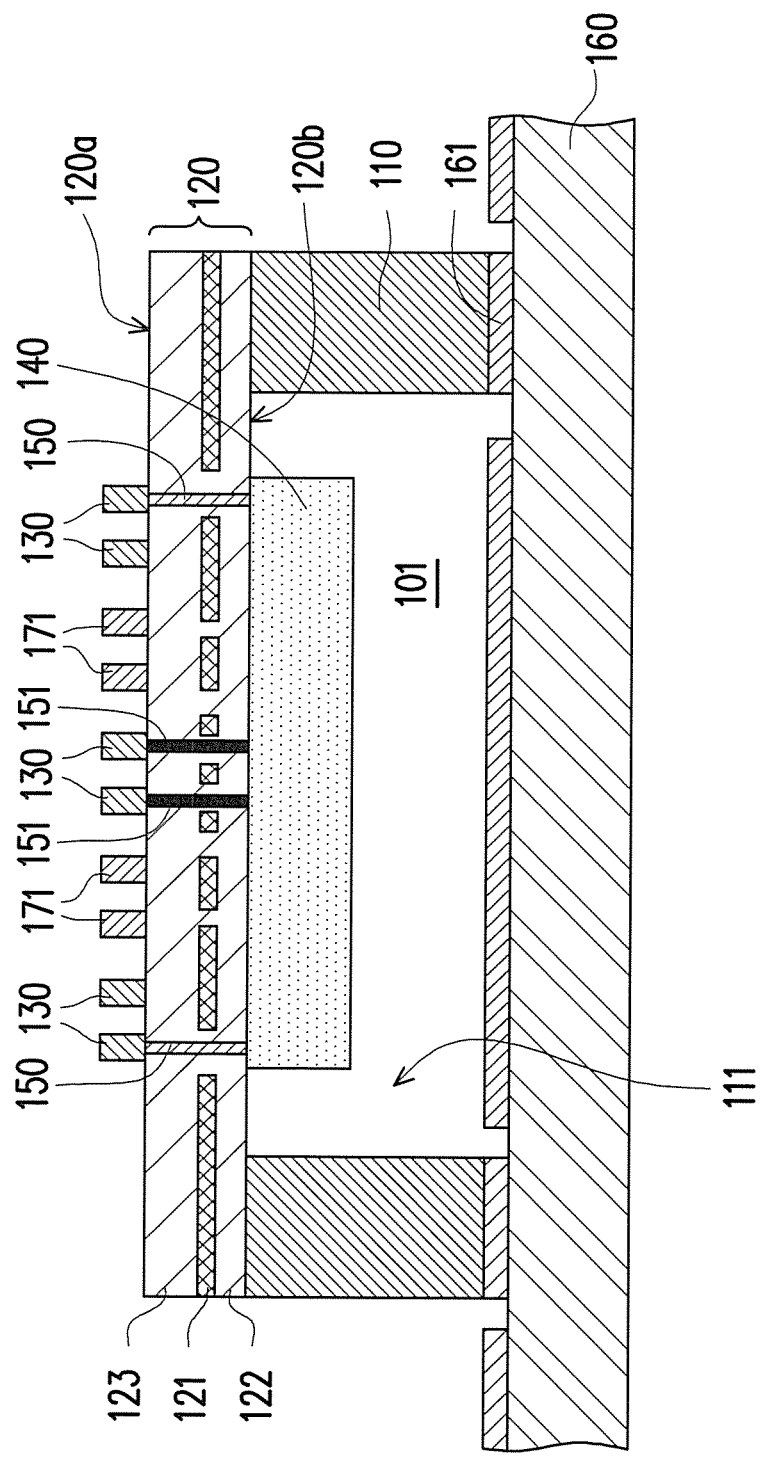
FIG. 6A is a schematic partial cross-sectional view illustrating the micro-electromechanical temperature control system depicted in FIG. 5 along a sectional line I-I.
Figure 6B:
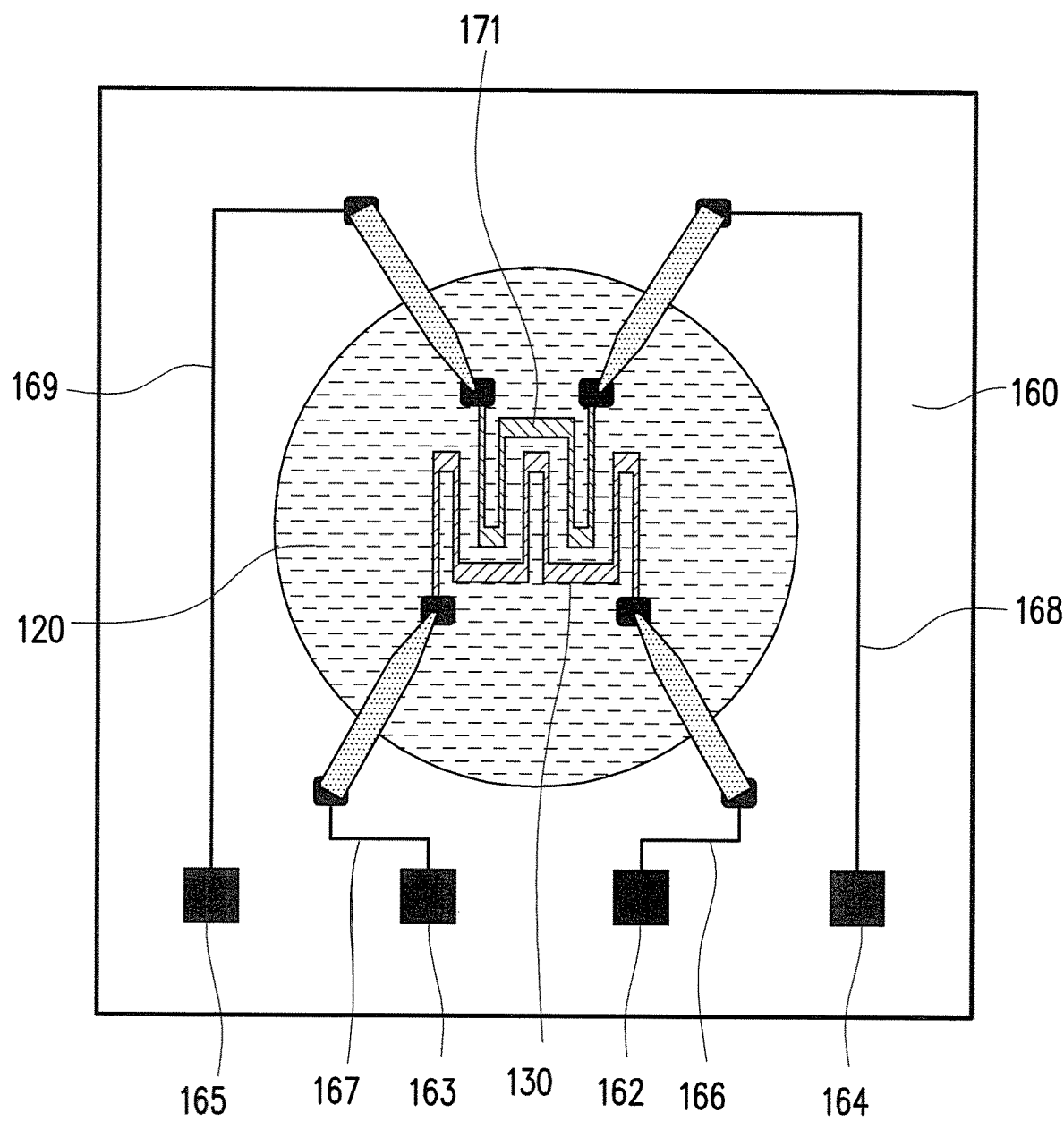
FIG. 6B is a schematic enlarged cross-sectional view illustrating the micro-electromechanical temperature control system depicted in FIG. 5.

FIG. 5 is a schematic top view illustrating a micro-electromechanical temperature control system according to a first exemplary embodiment of the disclosure. FIG. 6A is a schematic partial cross-sectional view illustrating the micro-electromechanical temperature control system depicted in FIG. 5 along a sectional line I-I. FIG. 6B is a schematic enlarged cross-sectional view illustrating the micro-electromechanical temperature control system depicted in FIG. 5. With reference to FIG. 5, FIG. 6A, and FIG. 6B, in the exemplary embodiment, the micro-electromechanical temperature control system 200 includes a micro-electromechanical apparatus 100 that may be employed in an environment sensor for detecting environmental properties, such as gas, a temperature, or air quality of the surroundings. The micro-electromechanical apparatus 100 includes a base 110, a film 120, a heater 130, and a thermal reservoir 140. The base 110 is made of a silicon material, or any other semiconductor material, or a glass material. The film 120 is, for instance, made of silicon nitride ($Si_3N_4$) or silicon dioxide ($SiO_2$), or any other appropriate material. The base 110 has a space 111. In the exemplary embodiment, the film 120 disposed on the base 111 completely covers the space 111. In another exemplary embodiment, the film may partially cover the space and expose a portion of the space, which prevents the heat from being dissipated through the film.

The film 120 has a first surface 120a and a second surface 120b opposite to the first surface 120a. One portion of the second surface 120b of the film 120 is connected to the base 110, and the other portion of the second surface 120b of the film 120 covers the space 111. The film 120 described in the exemplary embodiment is a multi-layered film including a first material layer 121 and two second material layers 122 and 123. In another exemplary embodiment, the film is a single-layer film. The number of layers of the film is not limited thereto in the disclosure. The second material layer 122 is disposed on the base 110. The first material layer 121 is disposed on the second material layer 122. The second material layer 123 is disposed on the first material layer 121. That is, in the exemplary embodiment of the multi-layered film, the second material layer 122, the first material layer 121, and the second material layer 123 are sequentially stacked. The film 120 is disposed on the base 110, in one of the exemplary embodiment, by performing a micro-electromechanical thin film deposition process (MEMS thin film deposition process). Here, the first material layer 121 is disposed between the second material layers 122 and 123, and the second material layer 122 is disposed on the base 110. In order to reduce the residual stress generated after the film 120 is bonded to the base 110, a coefficient of thermal expansion (CTE) of the first material layer 121 is greater than a CTE of the base 110. A CTE of each of the second material layers 122 and 123 is less than the CTE of the base 110. In the exemplary embodiment, the base 110 is made of silicon or glass, and so on. The first material layer 121 is made of silicon nitride ($Si_3N_4$), for example. The second material layers 122 and 123 are made of silicon dioxide ($SiO_2$), for instance.

The heater 130 is disposed on the first surface 120a of the film 120. The thermal reservoir 140 is disposed on the second surface 120b of the film 120 and is disposed in the space 111 of the base 110. That is, the heater 130 and the thermal reservoir 140 are disposed at two respective sides of the film 120. The heater 130 is disposed on the second material layer 123, and the thermal reservoir 140 is disposed on the second material layer 122. The heater 130 is, for instance, a heating coil and is made of platinum (Pt) or titanium (Ti) or tungsten (W), and so on. The heater 130 generates heat when an electrical current is applied to the heater 130. In another aspect, the thermal reservoir 140 is a bump, and is made of silicon, for instance.

In the exemplary embodiment, the micro-electromechanical apparatus 100 further includes at least one electrically conductive and thermally conductive element 150. The electrically conductive and thermally conductive element 150 penetrates the film 120 to electrically connect the heater 130 and the thermal reservoir 140. In the exemplary embodiment, the electrically conductive and thermally conductive element 150 and the heater 130 are electrically connected in parallel. A material of the electrically conductive and thermally conductive element 150 is, for instance, metal, metal alloy, or any other appropriate electrically conductive and thermally conductive material. The electrically conductive and thermally conductive element 150 has a good thermal conductivity, and thus, and the heater 130 can thermally couple to the thermal reservoir 140 through the electrically conductive and thermally conductive element 150. In this disclosure, the term "thermal coupling" or "thermally couple" can be interpreted as the heat is conducted from one object to another. The type of thermal coupling includes direct thermal coupling and indirect thermal coupling. In the exemplary embodiment, the heater 130 is not in a direct contact with the thermal reservoir 140, whereas the heat can be conducted to the thermal reservoir 140 from the heater 130 through the electrically conductive and thermally conductive element 150 or the heat can be conducted to the heater 130 from the thermal reservoir 140 through the electrically conductive and thermally conductive element 150. Hence, the type of coupling between the heater 130 and the thermal reservoir 140 is indirect thermal coupling. On the other hand, the electrically conductive and thermally conductive element 150 is directly thermally coupled to the heater 130 or to the thermal reservoir 140. That is, the electrically conductive and thermally conductive element 150 is in a direct contact with the heater 130 or the thermal reservoir 140, and hence the heat can be directly conducted from the electrically conductive and thermally conductive element 150 to the heater 130 or to the thermal reservoir 140. In another exemplary embodiment, the heater 130 or the thermal reservoir 140 is indirectly thermally coupled to the electrically conductive device through another thermally conductive element, for instance.

When an electrical current is applied to the heater 130, and the heater 130 generates the heat, and the heat may be conducted to the thermal reservoir 140 through the electrically conductive and thermally conductive element 150. Since the specific heat capacity of the thermal reservoir 140 is greater than the specific heat capacity of the heater 130, the heat stored in the thermal reservoir 140 may not be easily dissipated. Hence, when the electrical current stops applying to the heater 130, the heater 130 will stop generating the heat, and the heat stored in the thermal reservoir 140 is conducted to the heater 130 through the electrically conductive and thermally conductive element 150, so that the time during which the temperature of the heater 130 remains within a predetermined temperature range is extended. Besides, the thermal reservoir 140 not only stores the heat but also enhances the structural strength of the film 120, so as to lessen the impact of thermal stress. Namely, during the process of heating, the structural strength of the film 120 is increased to prevent the film 120 from being warped or cracked.

As shown in FIG. 6A, the micro-electromechanical temperature control system 200 further includes a substrate 160. The base 110 is disposed on the substrate 160. The base 110 and the substrate 160 is bonded by a bonding layer 161. For example, the bonding layer 161 is made of glass frit. A thermally insulating chamber 101 is defined by the base 160, the substrate 110, and the film 120. In the exemplary embodiment, the thermal reservoir 140 is enclosed in the thermally insulating chamber 101, and therefore the heat stored in the thermal reservoir 140 may not be easily dissipated to the surroundings. In order to prevent the heat stored in the thermal reservoir 140 from being conducted to the outside of the thermally insulating chamber 101 by gas leakage, the thermally insulating chamber 101 may be a hermetic chamber, for instance. The hermetic chamber is, for example, a vacuum chamber, so as to further enhance the thermal insulation capability.

With reference to FIG. 5, FIG. 6A, and FIG. 6B, in the exemplary embodiment, the micro-electromechanical temperature control system 200 further includes an IC (integrated circuit) chip 210, e.g., an application-specific integrated circuit (ASIC) chip. The micro-electromechanical apparatus 100 may be integrated with the IC chip 210 to form a micro-electromechanical temperature control system. The micro-electromechanical apparatus 100 further includes a temperature sensor 171, for example. The IC chip 210 includes a temperature control device 211. The temperature sensor 171 is disposed on the first surface 120a of the film 120, that is, disposed on the same side with the heater 130. A material of the temperature sensor 171 is, for instance, Pt. The temperature control device 211 is electrically coupled to the temperature sensor 171 and the heater 130, respectively. The temperature sensor 171 may be configured to sense the temperature around the film 120 and transmit the detected temperature data to the temperature control device 211. The temperature control device 211 is used to adjust an amount of electrical current applied to the heater 130 according to the temperature detected by the temperature sensor 171 and is further used to control the amount of heat generated by the heater 130, thereby the temperature around the film 120 may remain within a predetermined temperature range.

Particularly, when the temperature detected by the temperature sensor 171 is higher than a predetermined value, the temperature control device 211 may stop applying the electrical current to the heater 130, and thereby the heater 130 may stop generating the heat. Then, the heat stored in the thermal reservoir 140 may be conducted to the heater 130, such that the temperature around the film 120 may stay within the predetermined temperature range. After a certain period of time, the temperature around the film 120 may not stay within the predetermined temperature range. When the temperature detected by the temperature sensor 171 is lower than another predetermined value, the temperature control device 211 will apply the electrical current to the heater 130 to generate heat; thereby, the temperature around the film 120 can stay within the predetermined temperature range. That is, the heater 130, the thermal reservoir 140, and the temperature sensor 171 of the micro-electromechanical apparatus 100 provided in the exemplary embodiment may be integrated with the temperature control device 211 in the IC chip 210 to form the micro-electromechanical temperature control system 200. The micro-electromechanical temperature control system 200 may intermittently or selectively supply electrical power to the heater 130, so as to reduce the heating time and the heating frequency. Therefore, the micro-electromechanical temperature control system 200 may effectively reduce electrical power consumption because the temperature around the film 120 may remain within the predetermined temperature range without continuously supplying electrical power to the heater 130.

As shown in FIG. 5, the substrate 160 has a first conductive contact 162, a second conductive contact 163, a third conductive contact 164, and a fourth conductive contact 165. The first conductive contact 162 and the second conductive contact 163 are electrically connected to the heater 130 through a first conductive trace 166 and a second conductive trace 167. The third conductive contact 164 and the fourth conductive contact 165 are electrically connected to the temperature sensor 171 through a third conductive trace 168 and a fourth conductive trace 169. On the other hand, the temperature control device 211 has a fifth conductive contact 212, a sixth conductive contact 213, a seventh conductive contact 214, and an eighth conductive contact 215. The fifth conductive contact 212 is electrically connected to the first conductive contact 162 through a fifth conductive trace 216, and the sixth conductive contact 213 is electrically connected to the second conductive contact 163 through a sixth conductive trace 217. The seventh conductive contact 214 is electrically connected to the third conductive contact 164 through a seventh conductive trace 218, and the eighth conductive contact 215 is electrically connected to the fourth conductive contact 165 through an eighth conductive trace 219. In other words, the temperature control device 211 may be electrically connected not only to the heater 130 but also to the temperature sensor 171.

As shown in FIG. 6A, the micro-electromechanical apparatus 100 further includes a thermally conductive element 151 that may not be electrically conductive. The thermally conductive element 151 penetrates the film 120, and two end portions of the thermally conductive element 151 are connected to the heater 130 and the thermal reservoir 140 respectively, so as to provide an additional heat conducting path which reduces the time for conducting the heat between the heater 130 and the thermal reservoir 140. Namely, the heater 130 may be thermally coupled to the thermal reservoir 140 through the thermally conductive element 151. When the heater 130 generates the heat, the heat may be rapidly conducted to the thermal reservoir 140 through the electrically conductive and thermally conductive element 150 and the thermally conductive element 151. By contrast, when the electrical current stops applying to the heater 130, the heat stored in the thermal reservoir 140 may be rapidly conducted to the heater 130 through the electrically conductive and thermally conductive element 150 and the thermally conductive element 151, so as to achieve a better thermal conductivity.

Other exemplary embodiments are given hereinafter for explanation. It should be mentioned that reference numbers and some descriptions provided in the previous exemplary embodiment are also applied in the following exemplary embodiment. The same reference numbers represent the same or similar components in these exemplary embodiments, and repetitive descriptions are omitted. The omitted descriptions may be found in the previous exemplary embodiments.

Figure 7:
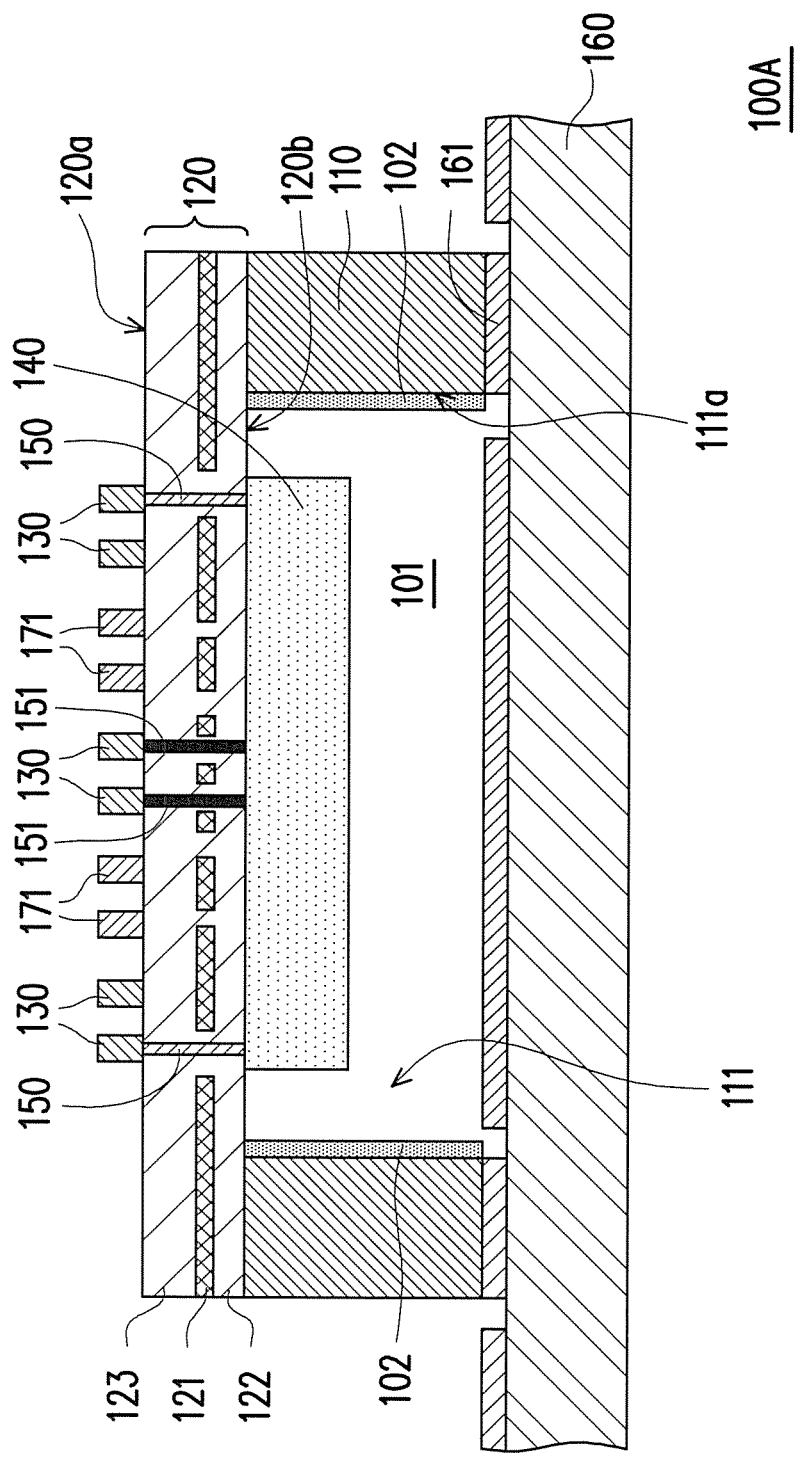
FIG. 7 is a schematic partial cross-sectional view illustrating a micro-electromechanical temperature control system according to a second exemplary embodiment of the disclosure.

FIG. 7 is a schematic partial cross-sectional view illustrating a micro-electromechanical temperature control system according to a second exemplary embodiment of the disclosure. With reference to FIG. 7, the micro-electromechanical apparatus 100A provided in the second exemplary embodiment is similar to the micro-electromechanical apparatus 100 provided in the first exemplary embodiment. One of the differences is that the micro-electromechanical apparatus 100A further includes a thermally insulating material 102 disposed on an inner sidewall 111a of the base 110. The thermally insulating material 102 is, for instance, silicon dioxide. The thermally insulating chamber 101 is defined by the base 110, the substrate 160, and the film 120. The thermally insulating material 102 is disposed on the inner sidewall 111a of the base 111 to prevent the heat stored in the thermal reservoir 140 from being dissipated to the surroundings.

Figure 8:
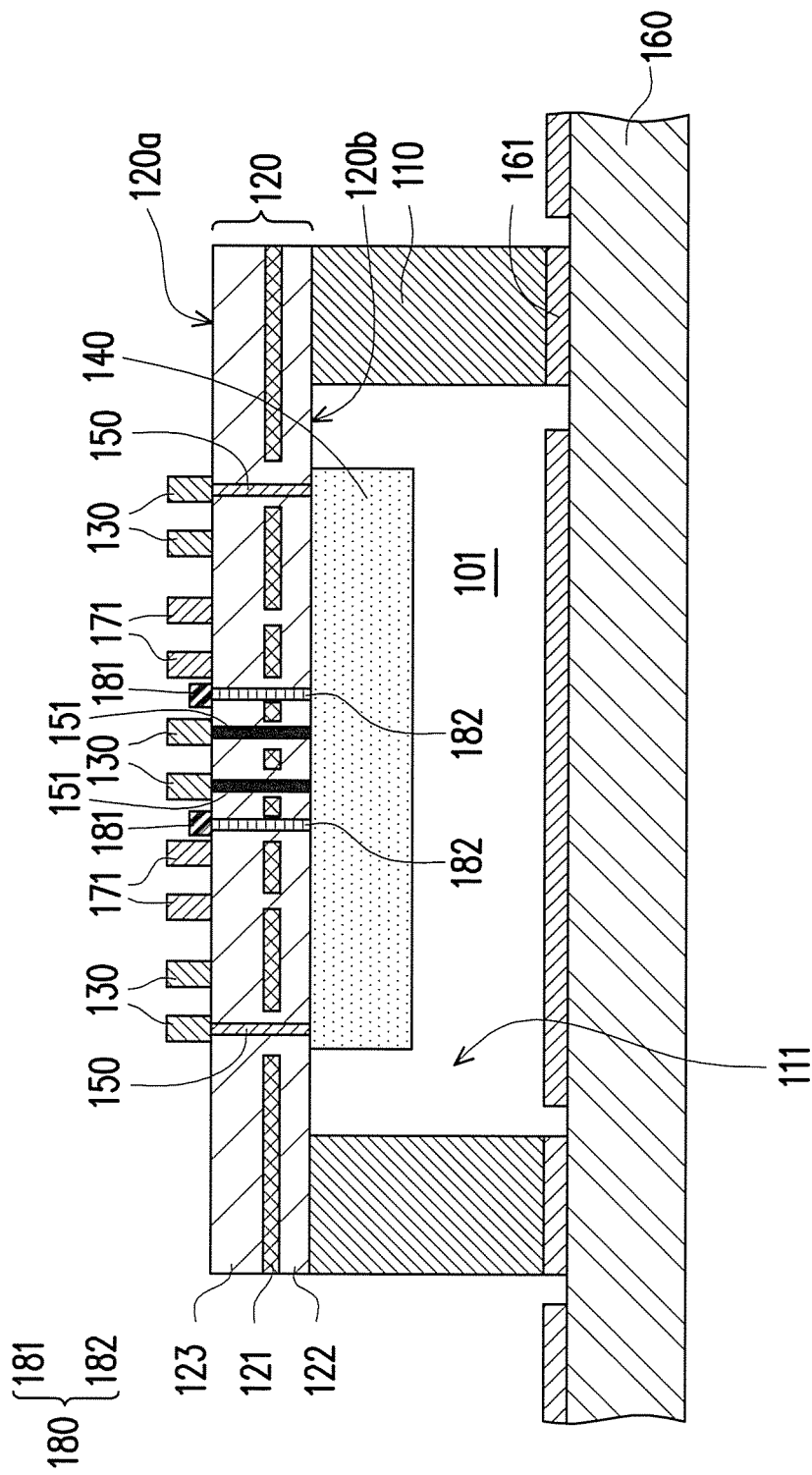
FIG. 8 is a schematic partial cross-sectional view illustrating a micro-electromechanical temperature control system according to a third exemplary embodiment of the disclosure.

FIG. 8 is a schematic partial cross-sectional view illustrating a micro-electromechanical temperature control system according to a third exemplary embodiment of the disclosure. With reference to FIG. 8, the micro-electromechanical apparatus 100B provided here is similar to the micro-electromechanical apparatus 100 provided in the first exemplary embodiment. One of the differences is that the micro-electromechanical apparatus 100B further includes a heat spreader 180 that includes a thermally conductive layer 181 and at least one thermally conductive element 182 (two thermally conductive elements are schematically illustrated in FIG. 8). The thermally conductive layer 181 is disposed on the first surface 120a of the film 120. The thermally conductive layer 181 is neither in contact with the temperature sensor 171 nor in contact with the heater 130. The thermally conductive element 182 penetrates the film 120, and two ends of the thermally conductive element 182 are connected to the thermally conductive layer 181 and the thermal reservoir 140, respectively. Namely, the thermally conductive layer 181 may be thermally coupled to the thermal reservoir 140 through the thermally conductive element 182.

A thermally conductive material of the thermally conductive element 182 is, for instance, silicon nitride or any other electrically insulating material. Since the thermally conductive element 182 is made of an electrically insulating material, the thermally conductive layer 181 is unable to be electrically connected to the thermal reservoir 140 through the thermally conductive element 182, which may prevent electrical short or other electrical issues (e.g., inaccurate measurement detected by the temperature sensor 171). The heat is conducted to the thermally conductive layer 181 through the thermally conductive element 182, such that a more uniform temperature distribution around the film 120 may be achieved.

Figure 9:
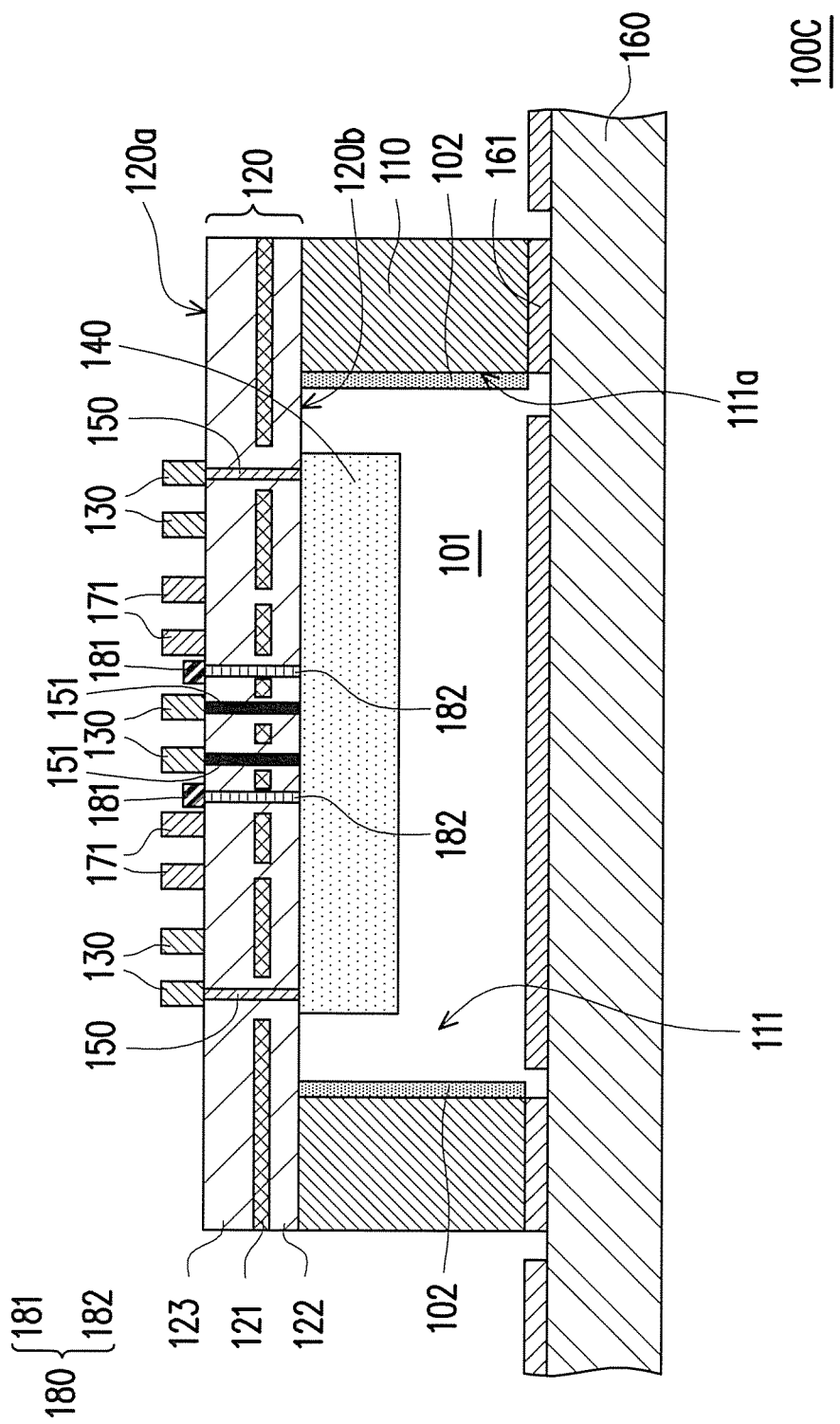
FIG. 9 is a schematic partial cross-sectional view illustrating a micro-electromechanical temperature control system according to a fourth exemplary embodiment of the disclosure.

FIG. 9 is a schematic partial cross-sectional view illustrating a micro-electromechanical temperature control system according to a fourth exemplary embodiment of the disclosure. With reference to FIG. 9, the micro-electromechanical apparatus 100C provided in the fourth exemplary embodiment is similar to the micro-electromechanical apparatus 100B provided in the third exemplary embodiment. One of the differences is that the micro-electromechanical apparatus 100C further includes a thermally insulating material 102 disposed on an inner sidewall 111a of the base 110. In the exemplary embodiment, the thermally insulating material 102 enhances the thermal insulation capability of the thermally insulating chamber 101, and, thus, prevents the heat stored in the thermal reservoir 140 from being dissipated to the surroundings rapidly.

Figure 10:
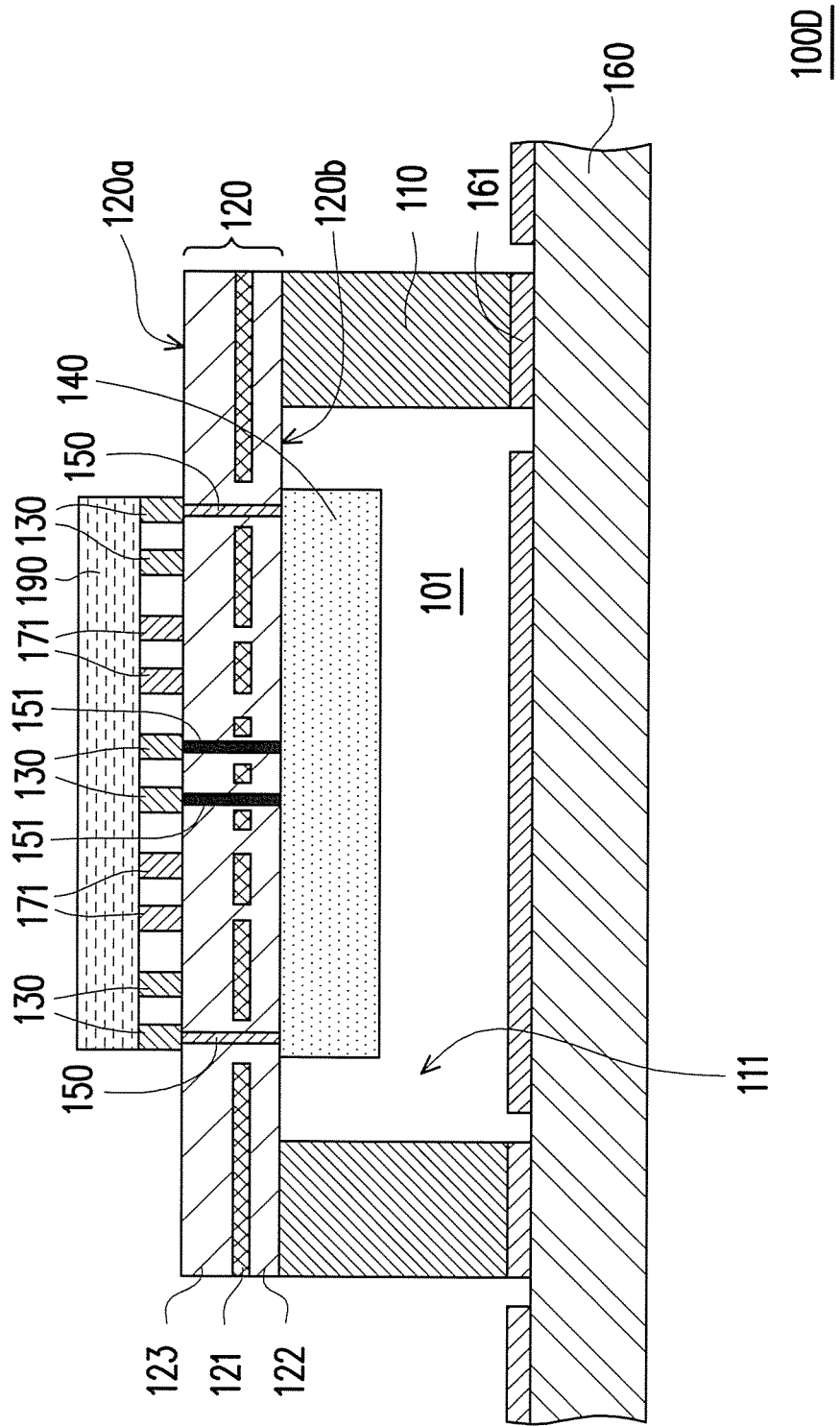
FIG. 10 is a schematic partial cross-sectional view illustrating a micro-electromechanical temperature control system according to a fifth exemplary embodiment of the disclosure.

FIG. 10 is a schematic partial cross-sectional view illustrating a micro-electromechanical temperature control system according to a fifth exemplary embodiment of the disclosure. With reference to FIG. 10, the micro-electromechanical apparatus 100D provided in the fifth exemplary embodiment is similar to the micro-electromechanical apparatus 100 provided in the first exemplary embodiment. One of the differences is that the micro-electromechanical apparatus 100D further includes a gas sensing layer 190 that is disposed on and is in contact with the heater 130 and the temperature sensor 171.

In the embodiment, the micro-electromechanical apparatus 100D is, for instance, a micro-electromechanical gas sensing apparatus. The gas sensing layer 190 is capable of sensing type of gas due to nano-catalysts in the gas sensing layer 190. Generally, the electrical resistance of the gas sensing layer 190 is changed in response to variations in the amount of gas absorbed by the gas sensing layer 190. Through measuring the amount of electrical current input to the gas sensing layer 190, the variations in the electrical resistance of the gas sensing layer 190 may be calculated. Then the concentration of gas around the micro-electromechanical apparatus 100D may be known. The heater 130 may heat the gas sensing layer 190 and keep the temperature of the gas sensing layer 190 to be within a predetermined temperature range. Thereby, as long as the concentration of the gas is changed, the variation of the electrical resistance of the gas sensing layer 190 is correspondingly changed. However, the high temperature induced by the heater 130 results in excessive stress on the film 120. The excessive stress makes the film 120 warped or cracked to cause inaccuracy in gas sensing. In the micro-electromechanical apparatus 100D, the thermal reservoir 140 is arranged on the second surface 120b of the film 120 to enhance the structural strength of the film 120. That is, when the heater 130 generates heat, the stress in the film 120 is decreased to avoid film warpage or film crack. As a result, the sensing accuracy and reliability of the micro-electromechanical apparatus 100D provided in the exemplary embodiment may be guaranteed.

The temperature sensor 171 is configured to detect the temperature of the gas sensing layer 190. When the temperature detected by the temperature sensor 171 is higher than a predetermined value, the temperature control device 211 (shown in FIG. 5) of the IC chip 210 (shown in FIG. 5) may stop applying the electrical current to the heater 130, and thereby the heater 130 may stop generating the heat. After the heater 130 stops generating the heat, the heat stored in the thermal reservoir 140 may be conducted to the heater 130 through the electrically conductive and thermally conductive element 150 and the thermally conductive element 151, such that the temperature of the gas sensing layer 190 may stay within the predetermine temperature range and may reach the operating temperature of the gas sensing layer 190. If, however, the heat stored in the thermal reservoir 140 is insufficient, and the temperature of the gas sensing layer 190 may not stay within the predetermined range, the temperature detected by the temperature sensor 171 is below another predetermined value. At the time, the temperature control device 211 (shown in FIG. 5) applies the electrical current to the heater 130 to generate heat, such that the temperature of the gas sensing layer 190 may stay within the predetermined temperature range and may reach the operating temperature of the gas sensing layer 190. The heater 130, the thermal reservoir 140, and the temperature control device 211 (shown in FIG. 5) of the IC chip 210 (shown in FIG. 5) may be integrated into the micro-electromechanical temperature control system. The micro-electromechanical temperature control system may keep the gas sensing layer within the predetermined temperature range by intermittently or selectively supplying electrical power to the heater 130. It may reduce the heating time and the heating frequency of the heater 130. Therefore, the micro-electromechanical temperature control system may effectively reduce electrical power consumption because the temperature of the gas sensing layer may remain within the predetermined temperature range without continuously supplying electrical power to the heater 130.

Figure 11:
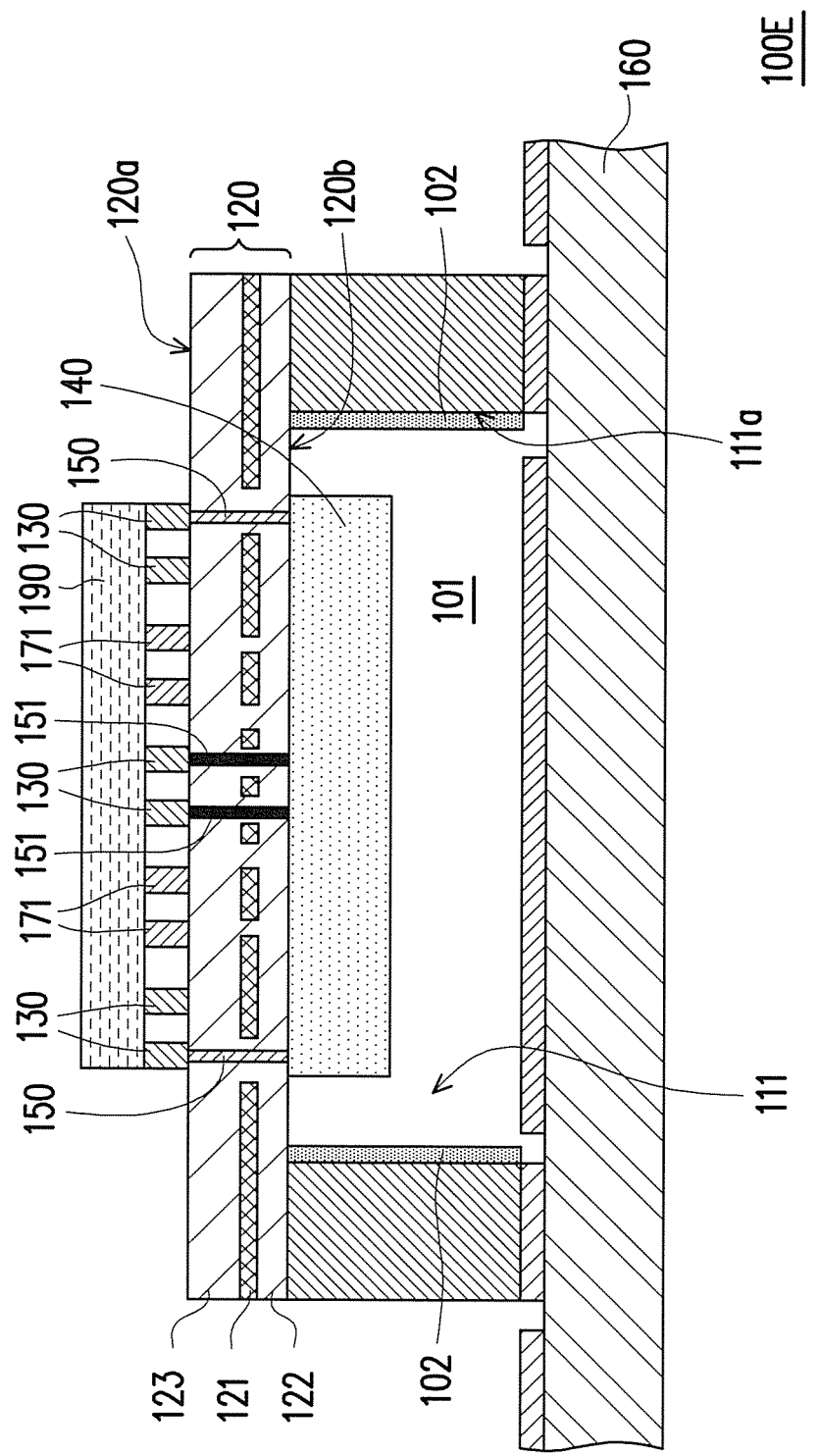
FIG. 11 is a schematic partial cross-sectional view illustrating a micro-electromechanical temperature control system according to a sixth exemplary embodiment of the disclosure.

FIG. 11 is a schematic partial cross-sectional view illustrating a micro-electromechanical temperature control system according to a sixth exemplary embodiment of the disclosure. With reference to FIG. 11, the micro-electromechanical apparatus 100E provided in the sixth exemplary embodiment is similar to the micro-electromechanical apparatus 100D provided in the fifth exemplary embodiment. One of the differences is that the micro-electromechanical apparatus 100E further includes a thermally insulating material 102 disposed on an inner sidewall 111a of the base 110. In the exemplary embodiment, the thermally insulating material 102 enhances the thermal insulation capability of the thermally insulating chamber 101 to prevent the heat stored in the thermal reservoir 140 from being dissipated to the surroundings rapidly.

Figure 12:
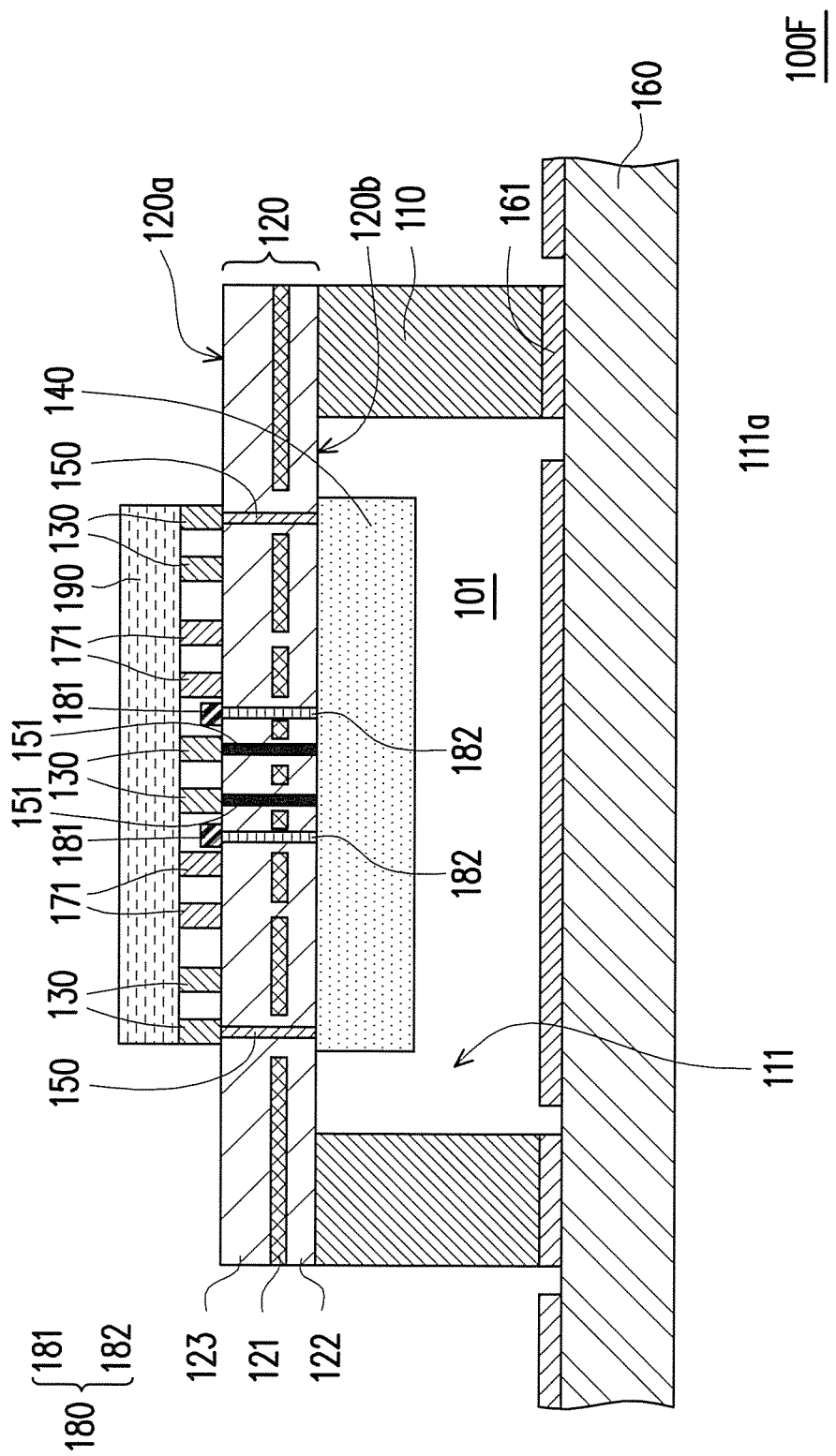
FIG. 12 is a schematic partial cross-sectional view illustrating a micro-electromechanical temperature control system according to a seventh exemplary embodiment of the disclosure.

FIG. 12 is a schematic partial cross-sectional view illustrating a micro-electromechanical temperature control system according to a seventh exemplary embodiment of the disclosure. With reference to FIG. 12, the micro-electromechanical apparatus 100F provided in the seventh exemplary embodiment is similar to the micro-electromechanical apparatus 100D provided in the fifth exemplary embodiment. One of the differences is that the micro-electromechanical apparatus 100F further includes a heat spreader 180. The heat spreader 180 includes a thermally conductive layer 181 and at least one first thermally conductive element 182 (two first thermally conductive elements are schematically illustrated in FIG. 12, but not limited thereto). The thermally conductive layer 181 is disposed on the first surface 120a of the film 120. The thermally conductive layer 181 neither connects to the temperature sensor 171 nor connects to the heater 130. The first thermally conductive element 182 penetrates the film 120, and two end portions of the first thermally conductive element 182 are connected to the thermally conductive layer 181 and the thermal reservoir 140, respectively. Namely, the thermally conductive layer 181 may be thermally coupled to the thermal reservoir 140 through the first thermally conductive element 182. The heat stored in the thermal reservoir 140 may be conducted to the thermally conductive layer 181 through the first thermally conductive element 182, so as to ensure the even distribution of the temperature of the gas sensing layer 190.

In the exemplary embodiment, the micro-electromechanical apparatus 100F may further include a second thermally conductive element 151 that is not electrically conductive. The second thermally conductive element 151 penetrates the film 120, and two end portions of the second thermally conductive element 151 are connected to the heater 130 and the thermal reservoir 140, respectively. Namely, the heater 130 may be thermally coupled to the thermal reservoir 140 through the second thermally conductive element 151. When the heater 130 generates the heat, the heat may be conducted to the thermal reservoir 140 through the electrically conductive and thermally conductive element 150 and the second thermally conductive element 151. By contrast, when the electrical current stops applying to the heater 130 to generate heat, the heat stored in the thermal reservoir 140 may be conducted to the heater 130 through the electrically conductive and thermally conductive element 150 and the thermally conductive element 151.

Figure 13:
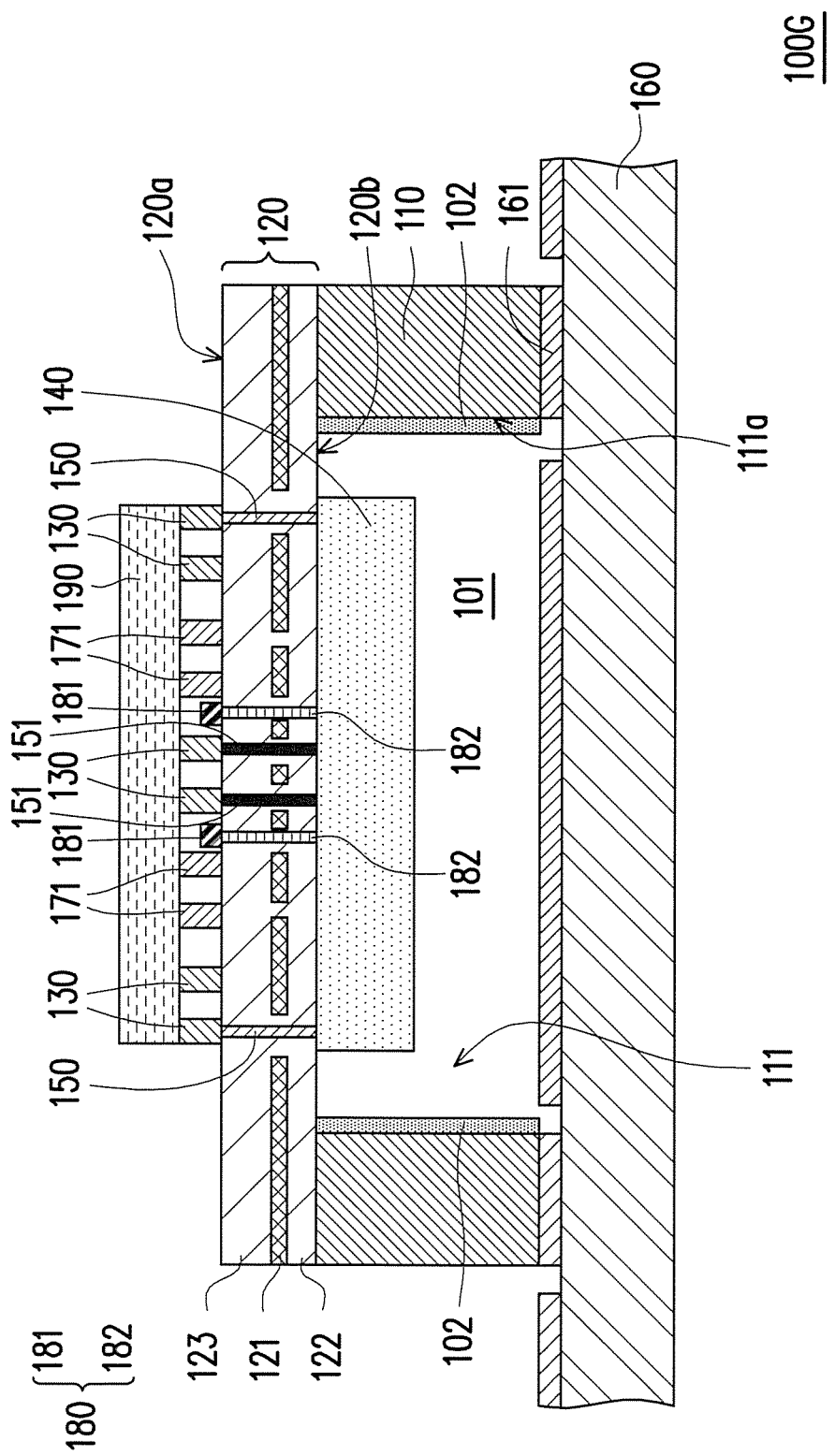
FIG. 13 is a schematic partial cross-sectional view illustrating a micro-electromechanical temperature control system according to an eighth exemplary embodiment of the disclosure.

FIG. 13 is a schematic partial cross-sectional view illustrating a micro-electromechanical temperature control system according to an eighth exemplary embodiment of the disclosure. With reference to FIG. 13, the micro-electromechanical apparatus 1000 provided in the eighth exemplary embodiment is similar to the micro-electromechanical apparatus 100F provided in the seventh exemplary embodiment. One of the differences is that the micro-electromechanical apparatus 100G further includes a thermally insulating material 102 disposed on an inner sidewall 111a of the base 110. In the exemplary embodiment, the thermal insulating material 102 enhances the thermal insulation capability of the thermally insulating chamber 101 to prevent the heat stored in the thermal reservoir 140 from being dissipated to the surroundings rapidly.

Figure 14:
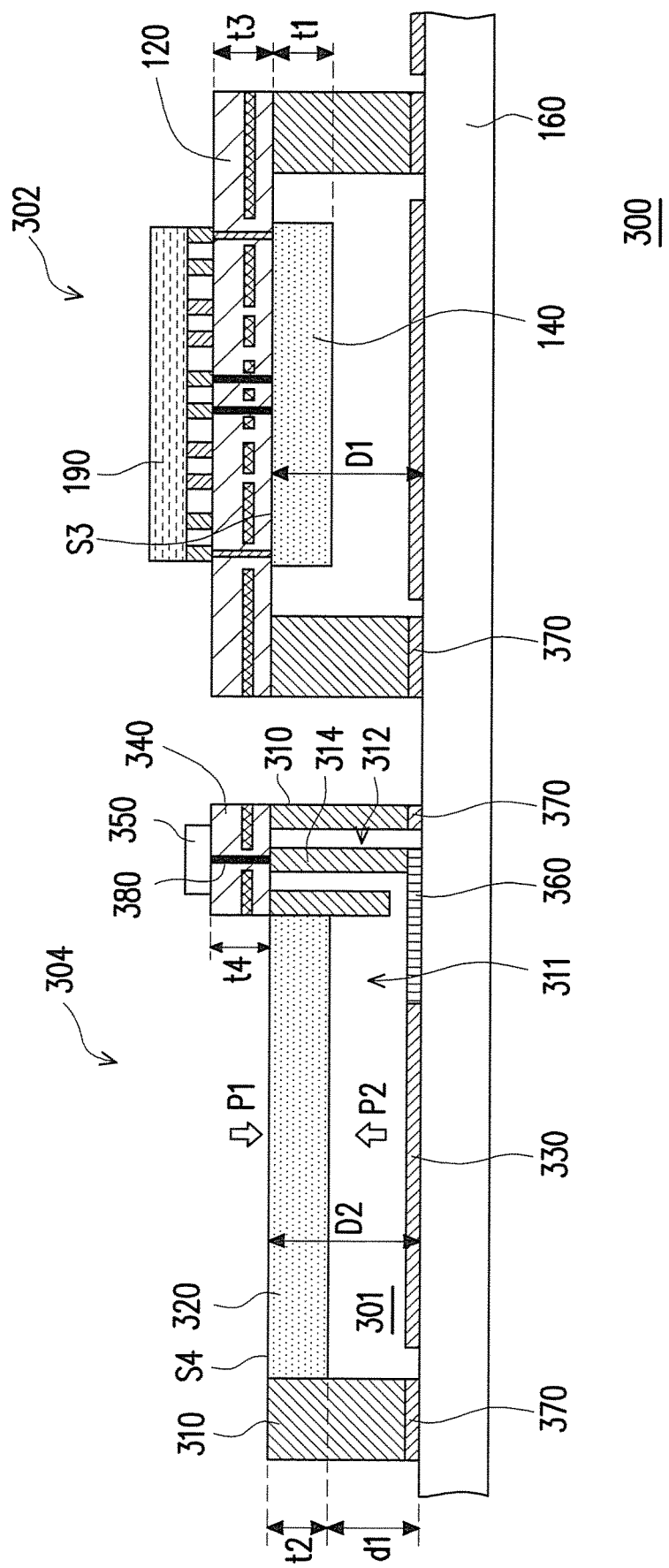
FIG. 14 is a schematic partial cross-sectional view illustrating a micro-electromechanical temperature control system according to a ninth exemplary embodiment of the disclosure.

FIG. 14 is a schematic partial cross-sectional view illustrating a micro-electromechanical temperature control system according to a ninth exemplary embodiment of the disclosure. With reference to FIG. 14, micro-electromechanical environment sensing apparatus 300 includes a first micro-electromechanical apparatus 302 and a second micro-electromechanical apparatus 304. The first micro-electromechanical apparatus 302 is configured to sense the concentration of specific gas according to the material of the gas sensing layer 190. The second micro-electromechanical apparatus 304 senses the gas pressure P1 in the surroundings where a micro-electromechanical environment sensing apparatus 300 is disposed. The first micro-electromechanical apparatus 302 is similar to the micro-electromechanical apparatus 100D provided in the fifth exemplary embodiment. One of the differences is that the first micro-electromechanical apparatus 302 and the second micro-electromechanical apparatus 304 are integrated onto the same substrate 160 through performing the same micro-electromechanical manufacturing process. In other words, multifunctional environment sensors are formed in the micro-electromechanical environment sensing apparatus 300 by the same micro-electromechanical manufacturing process. That is, the second micro-electromechanical apparatus 304 may be formed by the same manufacturing process required for the first micro-electromechanical apparatus 302 without additional manufacturing process. Thereby, the manufacturing costs of the micro-electromechanical environment sensing apparatus 300 may be significantly reduced.

With reference to FIG. 14, the second micro-electromechanical apparatus 304 includes a second base 310, a movable electrode 320, a stationary electrode 330, a second film 340, and an electrically conductive pad 350. The second base 310 is disposed on the substrate 160 and has a second space 311. The movable electrode 320 is surrounded by the second base 310. All peripheral portions (i.e. borders) of the movable electrode 320 are connected to the second base 310, such that the movable electrode 320 is suspended above the stationary electrode 330. A distance d1 exists between the movable electrode 320 and the substrate 160. The second base 310 may be bonded to the substrate 160 through a bonding material, e.g., glass fit 370, so as to form a hermetic chamber 301 which is defined by the movable electrode 320, the second base 310, and the substrate 160.

The hermetic chamber 301 may be in a vacuum state or has an inner air pressure P2. When the hermetic chamber 301 is in the vacuum state, absolute gas pressure in the surroundings may be obtained through the capacitance variations between the movable electrode 320 and the stationary electrode 330. When the hermetic chamber 301 has the inner air pressure P2, relative gas pressure in the surroundings may be obtained through capacitance variations between the movable electrode 320 and the stationary electrode 330.

The second base 310 also includes a through hole 312 and an electrically conductive pillar 314. The electrically conductive pillar 314 is disposed in the through hole 312, such that the electrically conductive pillar 314 is electrically insulated from the second base 310. The electrically conductive pillar 314 is connected to an electrically conductive trace 360 on the substrate 160, such that the electrically conductive pillar 314 may be electrically connected to the stationary electrode 330. The second micro-electromechanical apparatus 304 further includes a second electrically conductive element 380. The second film 340 is disposed on the second base 310 and covers the through hole 312 and the electrically conductive pillar 314. The second electrically conductive element 380 is disposed in the second film 340. The second electrically conductive element 380 is connected to the electrically conductive pillar 314 and the electrically conductive pad 350, such that the electrically conductive pad 350 is electrically connected to the stationary electrode 330.

According to the related art, two manufacturing processes are required for manufacturing the micro-electromechanical gas sensor and the micro-electromechanical air pressure sensor, respectively. The micro-electromechanical gas sensor and the micro-electromechanical air pressure sensor are respectively assembled to a substrate, so as to from a micro-electromechanical environmental sensor. As shown in the disclosure of FIG. 14, a first thickness t1 of the thermal reservoir 140 of the first micro-electromechanical apparatus 302 may be designed to be substantially equal to a second thickness t2 of the movable electrode 320 of the second micro-electromechanical apparatus 304. By such arrangement, the thermal reservoir 140 and the movable electrode 320 may be formed by the same etching step to reduce the manufacturing steps and the manufacturing costs. In the exemplary embodiment, a device layer of a silicon-on-insulator (SOI) wafer is etched to form a first recession and a second recession. The first recession and second recession are then etched to form the thermal reservoir 140 and the movable electrode 320 respectively. Since the same etching process is performed to form the first recession and the second recession, the first thickness t1 of the thermal reservoir 140 is equal to the second thickness t2 of the movable electrode 320, and a first distance D1 from a third surface S3 of the thermal reservoir 140 to the substrate is equal to a second distance D2 from a fourth surface S4 of the movable electrode 320 to the substrate. However, due to the variations in the etching step, the first thickness t1 of the thermal reservoir 140 may be slightly different from the second thickness t2 of the movable electrode 320. If an absolute value of a difference between the first thickness t1 and the second thickness t2 is less than 10% of the first thickness t1, the first thickness t1 is substantially equal to the second thickness t2. Similarly, if an absolute value of a difference between the first distance D1 and the second distance D2 is less than 10% of the first distance D1, the first distance D1 is substantially equal to the second distance D2.

In the disclosure, a third thickness t3 of the first film 120 of the first micro-electromechanical apparatus 302 is equal to a fourth thickness t4 of the second film 340 of the second micro-electromechanical apparatus 304; thereby, the same deposition step may be performed to form the first film 120 and the second film 340 at the same time. It may reduce the manufacturing steps and the manufacturing costs. However, due to the variations in the deposition step, the third thickness t3 of the first film 120 may be slightly different from the fourth thickness t4 of the second film 340. If an absolute value of the difference between the third thickness t3 and the fourth thickness t4 is less than 10% of the third thickness t3, the third thickness t3 is substantially equal to the fourth thickness t4.

In another embodiment that is not shown in the drawings, an additional etching step may be performed, such that the first thickness t1 of the thermal reservoir 140 is not substantially equal to the second thickness t2 of the movable electrode 320. By such arrangement, the performance of gas sensing and/or the performance of atmospheric pressure measuring by the micro-electromechanical environmental sensing apparatus 300 can be improved. For example, better sensitivity or reliability of the performance in gas sensing and/or pressure measuring can be achieved.

The disclosure provides a micro-electromechanical temperature control system with improved sensing accuracy and reliability which may reduce electrical power consumption when it is sensing the gas.

In the disclosure, the thermal reservoir is able to enhance the structural strength of the film to prevent the film from being warped or cracked by thermal stress. Hence, the micro-electromechanical temperature control system provided herein improves the sensing accuracy, sensitivity, and reliability. The micro-electromechanical temperature control system provided herein may intermittently or selectively supply electrical power to the heater so as to reduce the heating time and the heating frequency. Thereby, the micro-electromechanical temperature control system provided herein may keep the temperature of the gas sensing layer to be at a predetermined value or within a predetermined range, and may effectively reduce electrical power consumption by discontinuous electrical power supply to the heater.

To sum up, the thermal reservoir is able to enhance the structural strength of the film and prevent the film from being warped or cracked by thermal stress. When the temperature detected by the temperature sensor is higher than a predetermined value, the temperature control device may stop applying the electrical current to the heater, and thereby the heater may stop generating the heat. As long as the heater stops generating the heat, the heat stored in the thermal reservoir is conducted to the heater, so as to extend the time during which the temperature around the film remains within a predetermined temperature range. If the temperature detected by the temperature sensor is lower than another predetermined value, the temperature control device applies the electrical current into the heater to generate heat; thereby, the temperature around the film may again stay within the predetermined temperature range. Moreover, the heat generated by the heater may be conducted to the thermal reservoir. Since the specific heat capacity of the thermal reservoir is greater than the specific heat capacity of the heater, the heat stored in the thermal reservoir may not be dissipated rapidly.

The heater and the thermal reservoir of the micro-electromechanical apparatus may be integrated with the temperature control device in the IC chip to form the micro-electromechanical temperature control system. The micro-electromechanical temperature control system may intermittently or selectively supply electrical power to the heater to reduce the heating time and the heating frequency. Besides, the micro-electromechanical temperature control system may effectively reduce electrical power consumption by discontinuous electrical power supply to the heater to keep temperature around the film within the predetermined temperature range.

From another perspective, a thermally insulating chamber is defined by the base, the substrate, and the film. In order to prevent the heat stored in the thermal reservoir from being conducted to the outside of the thermally insulating chamber by gas leakage, the thermally insulating chamber may be a hermetic chamber, for instance. The hermetic chamber is, for instance, a vacuum chamber, so as to further enhance the thermal insulation capability. As a result, the heat stored in the thermal reservoir may not be easily dissipated to the surroundings.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A micro-electromechanical temperature control system comprising:
    a micro-electromechanical apparatus comprising:
        a base having a space;
        a film disposed on the base, wherein the film has a first surface and a second surface opposite to the first surface, and the film covers the space;
        a heater disposed on the first surface of the film; and
        a silicon bump disposed on the second surface of the film and enclosed in the space, wherein a specific heat capacity of the silicon bump is greater than a specific heat capacity of the heater.

2. The micro-electromechanical temperature control system as recited in claim 1, wherein the micro-electromechanical apparatus further comprises:
    at least one electrically conductive and thermally conductive element penetrating the film, wherein the heater electrically connects the silicon bump through the at least one electrically conductive and thermally conductive element.

3. The micro-electromechanical temperature control system as recited in claim 1, wherein the film comprises a first material layer and two second material layers, the first material layer is disposed between the two second material layers, a coefficient of thermal expansion of the first material layer is greater than a coefficient of thermal expansion of the base, and a coefficient of thermal expansion of the second material layer is less than the coefficient of thermal expansion of the base.

4. The micro-electromechanical temperature control system as recited in claim 1, further comprising:
    a substrate, wherein the base is disposed on the substrate, a thermally insulating chamber is defined by the substrate, the base and the film, the silicon bump is enclosed in the thermally insulating chamber.

5. The micro-electromechanical temperature control system as recited in claim 4, wherein the thermally insulating chamber is a hermetic chamber.

6. The micro-electromechanical temperature control system as recited in claim 4, wherein the micro-electromechanical apparatus further comprises:
    a thermally insulating material disposed on an inner sidewall of the base.

7. The micro-electromechanical temperature control system as recited in claim 4, wherein the micro-electromechanical apparatus further comprises:
    a heat spreader comprising at least one thermally conductive layer and at least one thermally conductive element, wherein the at least one thermally conductive layer is disposed on the first surface of the film, the at least one thermally conductive element penetrates the film, and the silicon bump connects the at least one thermally conductive layer through the at least one thermally conductive element.

8. The micro-electromechanical temperature control system as recited in claim 7, further comprising:
    an integrated circuit chip comprising a temperature control device, wherein the micro-electromechanical apparatus further comprising a temperature sensor disposed on the first surface of the film, the temperature control device is electrically coupled to the temperature sensor and the heater respectively, the temperature control device adjusts an amount of heat generated by the heater according to a temperature detected by the temperature sensor.

9. A micro-electromechanical temperature control system comprising:
    a micro-electromechanical apparatus comprising:
        a base having a space;
        a film disposed on the base wherein the film has a first surface and a second surface opposite to the first surface, and the film covers the space;
        a heater disposed on the first surface of the film;
        a silicon bump disposed on the second surface of the film and enclosed in the space; and
        a heat spreader comprising at least one thermally conductive layer and at least one thermally conductive element,
        wherein a specific heat capacity of the silicon bump is greater than a specific heat capacity of the heater, the at least one thermally conductive layer is disposed on the first surface of the film, the at least one thermally conductive element penetrates the film, and the silicon bump connects through the at least one thermally conductive element with the at least one thermally conductive layer.

10. The micro-electromechanical temperature control system as recited in claim 9, wherein the micro-electromechanical apparatus further comprises:
    at least one electrically conductive and thermally conductive element penetrating the film, wherein the heater connects through the at least one electrically conductive and thermally conductive device element with the silicon bump.

11. The micro-electromechanical temperature control system as recited in claim 9, wherein the film comprises a first material layer and two second material layers, the first material layer is disposed between the two second material layers, a coefficient of thermal expansion of the first material layer is greater than a coefficient of thermal expansion of the base, and a coefficient of thermal expansion of the second material layer is less than the coefficient of thermal expansion of the base.

12. The micro-electromechanical temperature control system as recited in claim 9, further comprising:
    an integrated circuit chip comprising a temperature control device, wherein the micro-electromechanical apparatus further comprising a temperature sensor is disposed on the first surface of the film, the temperature control device is electrically coupled to the temperature sensor and the heater respectively, the temperature control device adjusts an amount of heat generated by the heater according to a temperature detected by the temperature sensor.

13. A micro-electromechanical temperature control system comprising:
    a micro-electromechanical apparatus comprising:
        a base having a space;
        a film disposed on the base, wherein the film has a first surface and a second surface opposite to the first surface, and the film covers the space;
        a heater disposed on the first surface of the film;
        a silicon bump disposed on the second surface of the film and enclosed in the space; and
        a temperature sensor disposed on the first surface of the film; and
    an integrated circuit chip comprising:
        a temperature control device electrically coupled to the temperature sensor and the heater, respectively, wherein a specific heat capacity of the silicon bump is greater than a specific heat capacity of the heater, the temperature control device adjusts an amount of heat generated by the heater according to a temperature detected by the temperature sensor.

14. The micro-electromechanical temperature control system as recited in claim 13, wherein the micro-electromechanical apparatus further comprises:

at least one electrically conductive and thermally conductive element penetrating the film, wherein the heater electrically connects through the at least one electrically conductive and thermally conductive device element with the silicon bump.

15. The micro-electromechanical temperature control system as recited in claim 13, wherein the film comprises a first material layer and two second material layers, the first material layer is disposed between the two second material layers, a coefficient of thermal expansion of the first material layer is greater than a coefficient of thermal expansion of the base, and a coefficient of thermal expansion of the second material layer is less than the coefficient of thermal expansion of the base.

16. The micro-electromechanical temperature control system as recited in claim 13, further comprising:

a substrate, wherein the base is disposed on the substrate, a thermally insulating chamber is defined by the substrate, the base and the film, the silicon bump is enclosed in the thermally insulating chamber.

17. The micro-electromechanical temperature control system as recited in claim 16, wherein the thermally insulating chamber is a hermetic chamber.

18. The micro-electromechanical temperature control system as recited in claim 16, wherein the micro-electromechanical apparatus further comprises:

a thermally insulating material disposed on an inner sidewall of the base.

* * * * *